Figure 1:
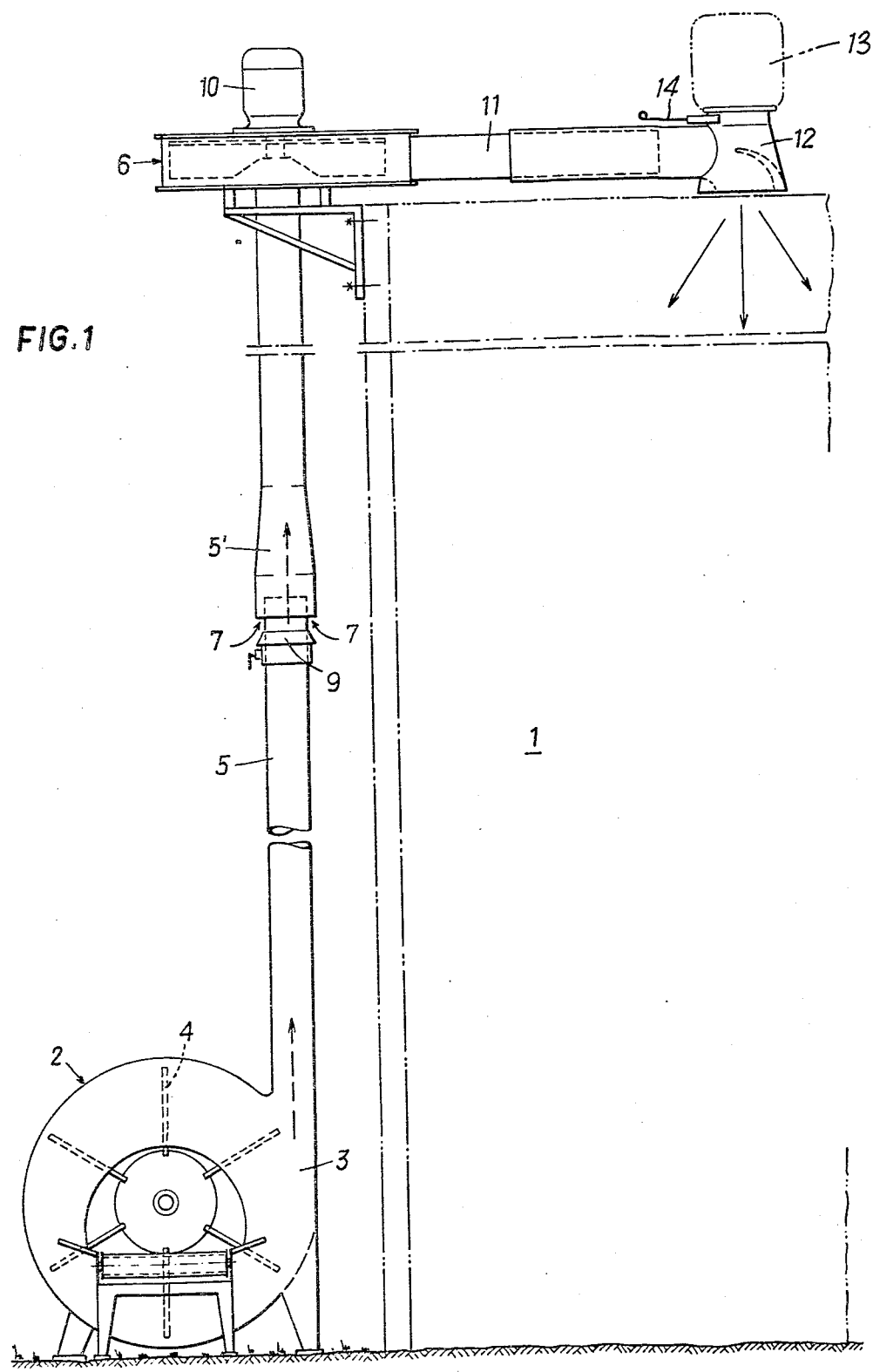

United States Patent [19]

Wolf

[11] 4,199,281
[45] Apr. 22, 1980

[54] SILO INSTALLATION
[75] Inventor: Johann Wolf, Scharnstein, Austria
[73] Assignee: Johann Wolf Gesellschaft m.b.H. KG., Scharnstein, Austria
[21] Appl. No.: 925,687
[22] Filed: Jul. 18, 1978
[30] Foreign Application Priority Data
  Jul. 20, 1977 [AT] Austria .................................. 5249/77
[51] Int. Cl.² ............................................. B65G 53/08
[52] U.S. Cl. ....................................... 406/93; 406/104; 406/165
[58] Field of Search ................. 302/11, 21, 24, 28, 302/34, 37, 59, 60, 61, 17, 38; 406/165, 104, 100, 162, 173, 57, 80, 93, 191; 193/23

[56] References Cited
U.S. PATENT DOCUMENTS

| 1,505,676 | 8/1924 | Strohmaier | 193/23 |
| 3,235,314 | 2/1966 | Schorer | 302/59 X |
| 3,310,184 | 3/1967 | Dauer | 406/165 X |
| 3,675,796 | 7/1972 | Atkinson et al. | 302/60 X |

FOREIGN PATENT DOCUMENTS 1160321  8/1969  United Kingdom ...................... 406/173

Primary Examiner—James L. Rowland
Attorney, Agent, or Firm—Young & Thompson

[57] ABSTRACT

A lower fan having an intake passage and an upwardly directed delivery passage is mounted below an upper fan, which is mounted near the top level of a tower silo and has an upwardly directed intake passage and a delivery passage. Means are provided for supplying bulk material to the intake passage of the lower fan. A substantially vertical pipeline connects said delivery passage of said lower fan to said intake passage of said upper fan. A rotary distributor unit is connected to said delivery passage of said upper fan and adapted to receive bulk material from said delivery passage of said upper fan and to distribute said bulk material in said tower silo.

7 Claims, 4 Drawing Figures

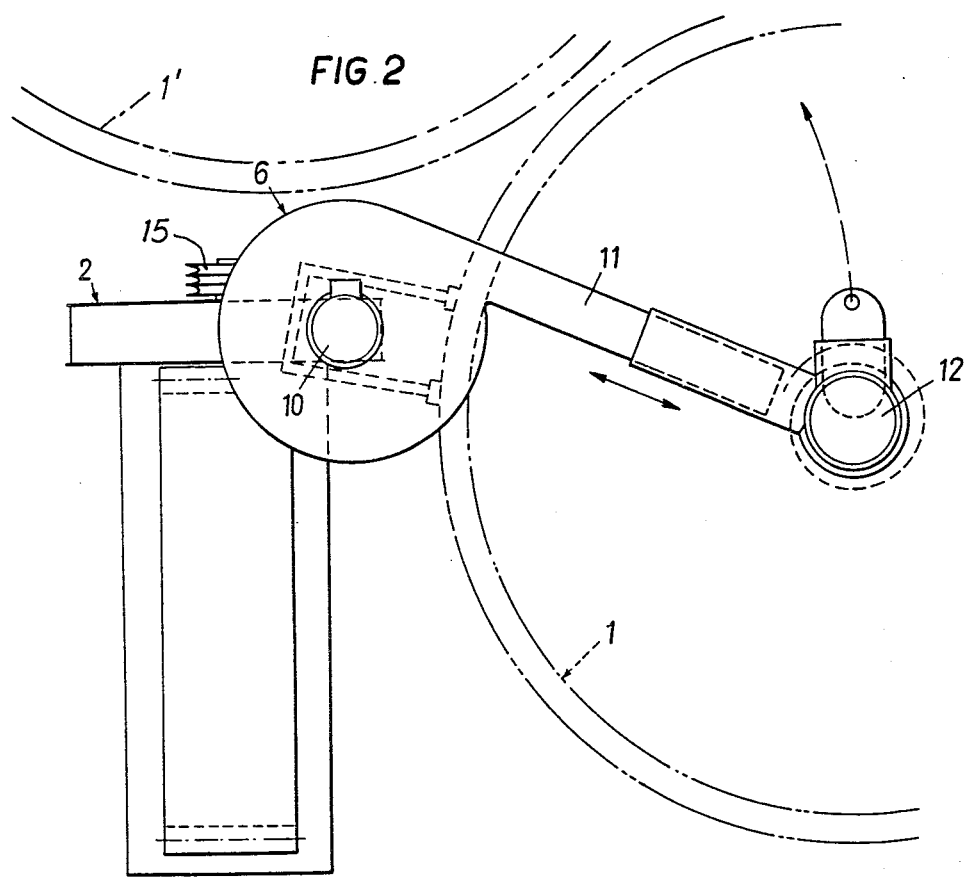
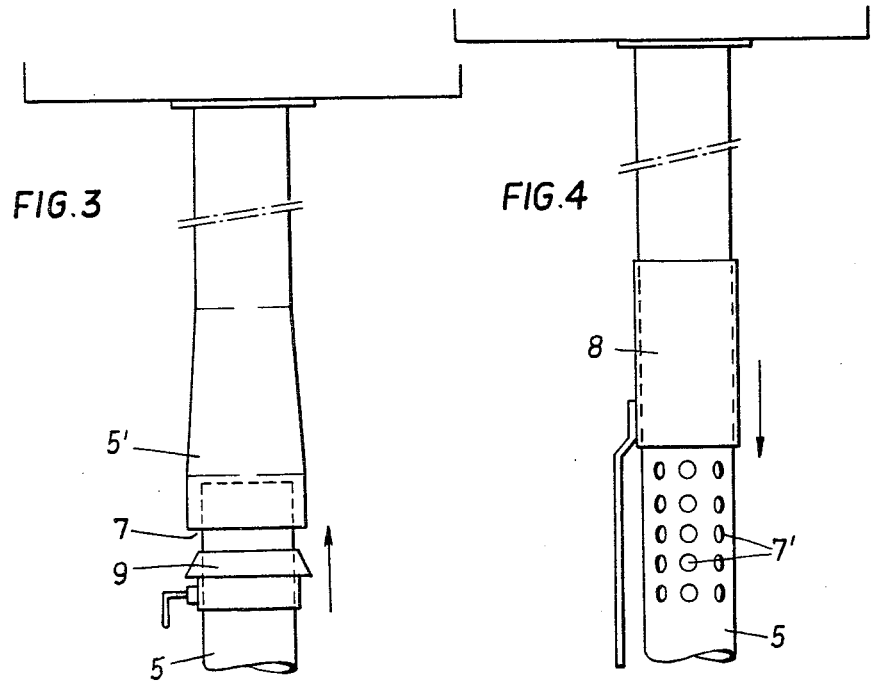

SILO INSTALLATION

This invention relates to feeding and distributing apparatus for charging a tower silo, particularly with agricultural bulk material, such as silage or the like, by means of material-handling fans.

It is known to charge tower silos by means of stationary chopper-blowers, which are fed with the crop and disintegrate the latter and comprise an impeller for charging the disintegrated crop through a rising pipe and an outlet bend connected thereto into the silo cavity. When green forage becomes available in large batches in a rapid sequence, high powers are required to disintegrate the forage and elevate it into the silo cavity and often cannot be provided.

E.g. for maize or corn, it is known to use field choppers, which disintegrate the crop on the field, and to charge the disintegrated crop into the silo by means of a blower. This requires a lower power because the chopper is eliminated. On the other hand, a high feed rate is desired in order to minimize the standstill times of the expensive harvesting equipment and transport vehicles at the silo. Such high feed rate also requires a high power, which often cannot be provided.

Particularly in case of a feeding over a large height, the high feed rates often give rise to a clogging of pipes because particles of the material being fed may be braked in the pipeline by gravity, by friction between the particles and the pipeline, and by a collision of particles. As a result, individual crop particles are arrested on a relatively low level and are subsequently reversed and then collide with and arrest still rising particles. Such critical conditions quickly result in a clogging of the pipeline. Clogged pipelines can be cleared only after the clogged pipes have been removed and such removal is a time-consuming operation and may be dangerous. The resulting loss of time is undesirable particularly during the harvest, which depends on the weather. It has been attempted to avoid such trouble by the use of expensive feeders which enable a charging at a controlled rate and have a surplus power. Both measures are expensive and do not ensure in all cases a satisfactory, trouble-free charging.

Austrian Patent Specification 231,348 discloses apparatus which comprises an exhauster, which is mounted at the top end of a suction pipe and consists of a rotary distributor. That known apparatus also fails to ensure a trouble-free charging. The use of rotary distributors disclosed in U.S. Pat. Nos. 2,474,205 and 2,365,240 also cannot prevent a clogging of a pipe. Similar remarks are applicable to conveyors in which an upper pipe is at least in part of its length larger in diameter than a lower pipe, as has been disclosed in U.S. Pat. Nos. 772,124; 2,365,240; and 3,675,796.

In ventilating systems for storage tanks for agricultural products it is known to provide pipes and other air supply passages with air outlet and air inlet openings and to provide gate valves for varying the cross-section of air outlet openings (Austrian Patent Specifications 125,314; 252,814 and German Patent Specification 1,052,195). The adoption of that measure alone with known feeding and distributing apparatus cannot eliminate the disadvantages of such apparatus.

It is an object of the invention to eliminate these disadvantages and to provide feeding and distributing apparatus which ensure a reliable charging even of tall silos.

This object is accomplished according to the invention by the provision of at least two fans which are disposed one above the other and comprise a lower fan, which has an intake passage communicating with a feeder and a delivery passage connected by a substantially vertical pipeline to an intake passage of an additional fan, which is disposed in known manner on a level near the top level of the silo and communicates at its outlet with a rotary distributor.

In a particularly desirable embodiment of the invention, the fan disposed at the top of the silo consists in known manner of an exhauster and has a vertical axis and is coaxial with the vertical pipeline and is provided with a horizontal delivery conduit, which in known manner leads to the rotary distributor and is adjustable in length and pivotally movable in unison with the blower housing and adapted to be fixed in a plurality of positions. That arrangement may be used to charge a plurality of silos disposed one beside the other.

According to a further embodiment of the invention, the rotary distributor mounted at the end of the horizontal delivery conduit communicates with or consists of a cyclone and the cross-section of the air outlet opening of the cyclone is adjustable.

For use with particularly tall silos, a plurality of fans, usually three fans, may be provided, which are vertically spaced apart. In that case the intake passage of the or each intermediate fan is connected to a bend or an inclined portion of the pipeline. The fan disposed at the level of the top of the silo is arranged as described hereinbefore and is pivotally movable.

According to a further feature of the invention the pipeline is provided with air intake openings, which are distributed around the periphery and, if desired, over the height of the pipeline and can be varied in cross-section. In one illustrative embodiment, an upper pipe of the pipeline is larger in diameter at least in part of its length than a lower pipe, as is known per se, and the lower pipe extends into the upper pipe and defines a circular annular intake opening therewith. In that arrangement the cross-section of the intake opening can be varied by the provision of an upwardly tapering, adjustable ring, which can be fixed in several positions in which it is spaced different distances apart from the intake opening. Finally it is within the scope of the invention to provide an intake opening which consists of a plurality of known apertures, which are spaced vertically and around the periphery of the pipeline and can be covered at least in part by a slidable sleeve fitted on the pipeline.

Further details of the invention will be explained more in detail with reference to the accompanying drawings, which show two illustrative embodiments of the feeding and distributing apparatus according to the invention.

FIG. 1 is a side elevation showing the apparatus,

FIG. 2 a top plan view,

FIG. 3 a detail of the embodiment shown in FIGS. 1 and 2, and

FIG. 4 a detail of a modified embodiment.

In the embodiments of feeding and distributing apparatus which are shown on the drawings and serve to charge a plurality of tower silos 1,1', particularly with agricultural bulk material, such as silage or the like, a fan 2 is provided near the floor and can be fed manually via means 2' comprising a trough or a mechanical metering device comprising a belt conveyor or a screw conveyor provided with a trough. These metering devices ensure a uniform feeding of the fans so that the capacity of the latter will be utilized to a higher degree. The lower fan 2 is a blower and on its delivery side its housing is only slightly eccentrically enlarged at 3 relative to the impeller 4. Chopped heavy green forage which is to be fed is thrown up in a vertical pipeline 5 by the impeller 4, which comprises a plurality of moving vanes. The conveyance of the forage is assisted by the air which is taken in. The stream of material slows down as it rises in the pipeline and is subsequently accelerated by the suction exerted by a fan 6, which is disposed on the level of the top of the silo so that the forage is thrown to a larger total height.

The use of the invention effectively prevents an increasing deceleration of individual crop particles above a certain level and results in an acceleration of the entire stream of material toward the upper fan 6. As a result, the total height to which the crop can be raised by means of a certain power is much increased and the danger of an undesired clogging of pipes is much reduced.

The fan 6 having a vertical axis and disposed approximately on the level of the top of the silo is designed to handle air at a relatively high rate. This is accomplished in known manner by an appropriate design of the housing and impeller of the fan. To enable air to be taken in at the required rate, the vertical pipeline 5 is provided with air intake openings 7, 7', which are preferably provided with means to adjust the total cross-section of said openings. The air intake openings 7' of the pipeline 5 shown in FIG. 4 are spaced apart vertically and in the peripheral direction of the pipeline and can be covered at least in part by a slidable sleeve 8, which is fitted on the pipeline 5. In a preferred embodiment shown in FIGS. 1 and 3, an air intake opening 7 has the configuration of a circular ring and is defined between an upper pipe 5' and a lower pipe of the pipeline 5. The upper pipe 5' is larger in diameter than and receives the top end portion of the lower pipe. In that case the intake cross-section is adjustable by a tapering ring 9, which can be fixed in position.

The cooperation of a lower fan 2 consisting of a blower and a fan 6 disposed on the top level of the top of the silo and consisting of an exhauster does not only result in an improved performance, particularly in a feeding over a larger height, but affords also the advantage that the driving power is divided and can be generated by different sources. Preferably, the upper fan 6 is driven by an electric motor 10 and the fan 2 on the floor by a tractor motor 15 or by a tractor-mounted diesel engine. This advantage is significant in numerous farms where the power supply is inadequate in most cases and the connected load often must not exceed 10 kW.

The fan 6 disposed on the top level of the silo delivers the crop through a delivery pipe bend or a short horizontal delivery conduit 11, which is provided at the end with a known distributor, e.g., a rotary distributor 12 for discharging the crop into the silo. Such permanently installed plant can be used to charge a plurality of silos which are juxtaposed or arranged in groups if the horizontal delivery conduit and the rotary distributor 12 as well as the housing of the blower 6 are capable of a pivotal movement at least within a limited range and adapted to be fixed in positions associated with respective silos. To enable an adjustment to the center of the respective silo, the horizontal delivery conduit 11 consists of a telescopic tube.

When the delivery conduit 11 has been pivotally moved to the center of the respective silo, that conduit can be fixed in position by positioning linkages, which are supported on the silo wall or on a bracket which carries the fan. These linkages are not shown. The adjustment may be effected by means of pull ropes or pull chains which are operated from the floor. It will be understood that other means, such as an electric motor, may be used to adjust the delivery conduit.

The rotary distributor 12 provided at the end of the delivery conduit 11 communicates with a cyclone or the top of the distributor consists of a cyclone 13 which can discharge surplus air in an upward direction. The air which enters the silo cavity together with the crop assists the distribution of the forage but as the silo cavity is increasingly filled a major part of the air must be discharged upwardly by a cyclone. The cross-section of the upwardly facing air outlet opening is adjustable at 14 in order to enable an adaptation to the degree to which the silo has been filled.

The embodiments which have been shown and described serve only to facilitate the understanding of the nature of the invention and are not intended to restrict the invention to details.

What is claimed is:

1. A silo installation comprising a tower silo, a lower fan having an intake passage and an upwardly directed delivery passage, means for supplying bulk material to the intake passage of said lower fan, an upper fan mounted above the lower fan on a level near the top level of said tower silo and having an upwardly directed intake passage and a delivery passage, a substantially vertical pipeline connecting said delivery passage of said lower fan to said intake passage of said upper fan, a rotary distributor unit connected to said delivery passage of said upper fan and adapted to receive bulk material from said delivery passage of said upper fan and to distribute said bulk material in said tower silo, said rotary distributor unit being connected to the delivery passage of said upper fan by a horizontal delivery conduit and being mounted at the end of said delivery conduit opposite to said upper fan and said rotary distributor unit comprising a rotary distributor for distributing said bulk material in said tower silo and a cyclone having an air outlet opening and provided with means for adjusting the area of said air outlet opening.

2. Apparatus for charging a tower silo, comprising a lower fan having an intake passage and an upwardly directed delivery passage, means for supplying bulk material to the intake passage of said lower fan, and upper fan which is adapted to be mounted on a level near the top level of said tower silo and has a vertical axis and an upwardly directed intake passage and a delivery passage, a substantially vertical pipeline connecting said delivery passage of said lower fan to said intake passage of said upper fan, and a rotary distributor unit connected to said delivery passage of said upper fan and adapted to receive bulk material from said delivery passage of said upper fan and to distribute said bulk material in said tower silo, said vertical pipe having air intake means between said delivery passage of said lower fan and said intake passage of said upper fan, said air intake means comprising a plurality of apertures which are formed in the wall of said pipeline and spaced apart in the peripheral direction thereof.

3. Apparatus as set forth in claim 2, in which said air intake means comprise a plurality of vertically spaced apart apertures in the wall of said pipeline.

4. Apparatus for charging a tower silo, comprising a lower fan having an intake passage and an upwardly directed delivery passage, means for supplying bulk material to the intake passage of said lower fan, and upper fan which is adapted to be mounted on a level near the top level of said tower silo and has a vertical axis and an upwardly directed intake passage and a delivery passage, a substantially vertical pipeline connecting said delivery passage of said lower fan to said intake passage of said upper fan, and a rotary distributor unit connected to said delivery passage of said upper fan and adapted to receive bulk material from said delivery passage of said upper fan and to distribute said bulk material in said tower silo, said vertical pipe having air intake means between said delivery passage of said lower fan and said intake passage of said upper fan, and means for adjusting the area of said air intake means.

5. Apparatus for charging a tower silo, comprising a lower fan having an intake passage and an upwardly directed delivery passage, means for supplying bulk material to the intake passage of said lower fan, and upper fan which is adapted to be mounted on a level near the top level of said tower silo and has a vertical axis and an upwardly directed intake passage and a delivery passage, a substantially vertical pipeline connecting said delivery passage of said lower fan to said intake passage of said upper fan, and a rotary distributor unit connected to said delivery passage of said upper fan and adapted to receive bulk material from said delivery passage of said upper fan and to distribute said bulk material in said tower silo, said vertical pipe having air intake means between said delivery passage of said lower fan and said intake passage of said upper fan, said pipeline comprising an upper pipe which has a lower end portion and a lower pipe which has an upper end portion which has an outside diameter that is smaller than the inside diameter of said lower end portion of said upper pipe and extend into said lower end portion of said upper pipe to define an annular clearance therewith.

6. Apparatus as set forth in claim 5, in which
   a ring having an upwardly tapering outside peripheral surface is slidably mounted on said upper end portion of said lower pipe and adapted to extend into said clearance to define the area of said clearance at the lower end thereof, and
   means are provided for fixing said ring to said upper end portion on different levels.

7. Apparatus for charging a tower silo, comprising a lower fan having an intake passage and an upwardly directed delivery passage, means for supplying bulk material to the intake passage of said lower fan, and upper fan which is adapted to be mounted on a level near the top level of said tower silo and has a vertical axis and an upwardly directed intake passage and a delivery passage, a substantially vertical pipeline connecting said delivery passage of said lower fan to said intake passage of said upper fan, and a rotary distributor unit connected to said delivery passage of said upper fan and adapted to receive bulk material from said delivery passage of said upper fan and to distribute said bulk material in said tower silo, said vertical pipe having air intake means between said delivery passage of said lower fan and said intake passage of said upper fan, said air intake means comprising a plurality of apertures which are formed in the wall of said pipeline and spaced apart in the peripheral direction thereof and in the vertical direction, and a sleeve is slidably mounted on said pipeline and adapted to cover a desired portion of the area of said apertures.

* * * * *